Figure 1:
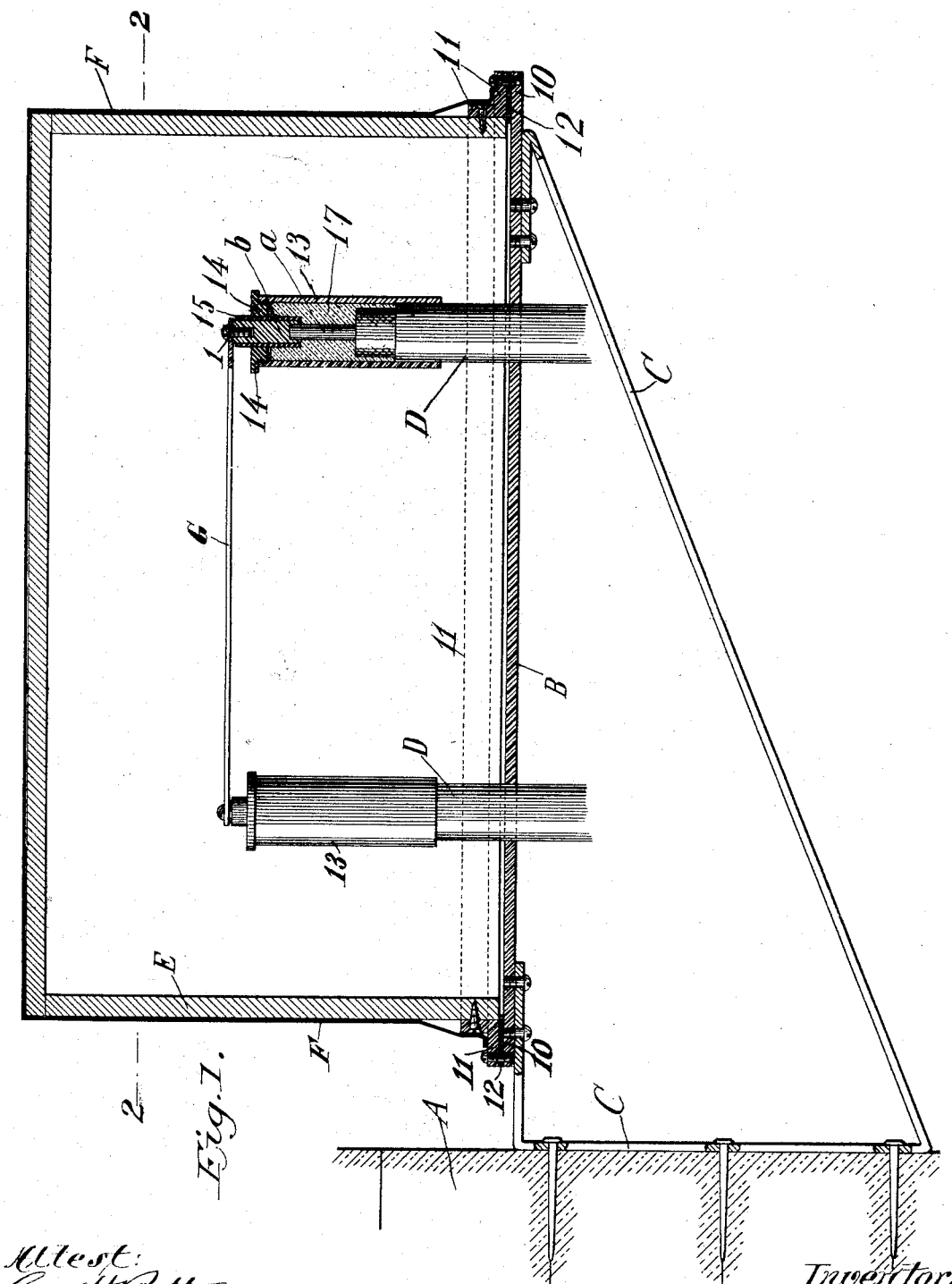

(No Model.) 2 Sheets—Sheet 1.

S. B. FOWLER.
JUNCTION BOX FOR ELECTRIC CABLES.

No. 506,683. Patented Oct. 17, 1893.

Attest:
Geo H Botts
J. F. Kehoe

Inventor:
Samuel B Fowler
by
Philipp Munson Phelps
Atty's (No Model.) 2 Sheets—Sheet 2.
S. B. FOWLER.
JUNCTION BOX FOR ELECTRIC CABLES.
No. 506,683. Patented Oct. 17, 1893.
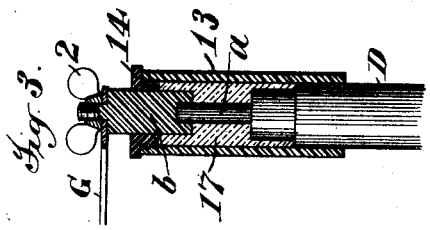
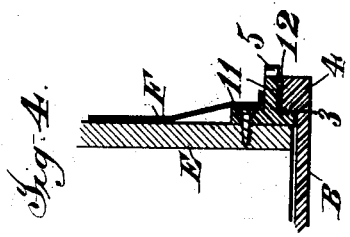
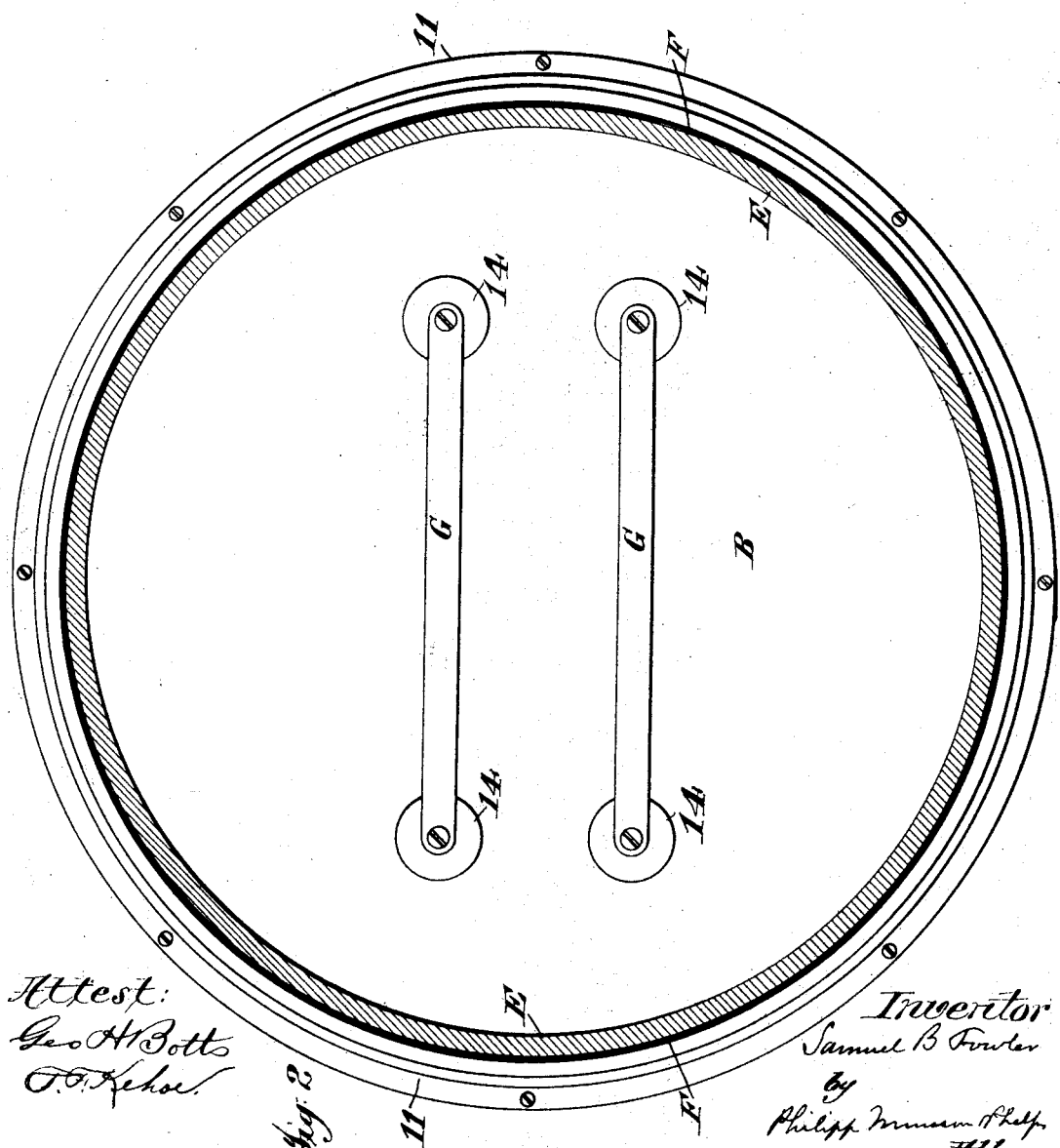
Attest:
Geo H Botts
T. F. Kehoe
Inventor
Samuel B Fowler
by
Philipp Munson Phelps
Attys

UNITED STATES PATENT OFFICE.

SAMUEL B. FOWLER, OF CHICAGO, ILLINOIS, ASSIGNOR TO THE STANDARD UNDERGROUND CABLE COMPANY, OF PITTSBURG, PENNSYLVANIA.

JUNCTION-BOX FOR ELECTRIC CABLES.

SPECIFICATION forming part of Letters Patent No. 506,683, dated October 17, 1893.

Application filed April 12, 1893. Serial No. 470,010. (No model.)

*To all whom it may concern:*

Be it known that I, SAMUEL B. FOWLER, a citizen of the United States, residing at Chicago, county of Cook, and State of Illinois, have invented certain new and useful Improvements in Junction-Boxes for Electric Cables, fully described and represented in the following specification and the accompanying drawings, forming a part of the same.

The object of the present invention is to provide a simple, cheap and efficient moisture proof construction of junction box and cable terminals.

As a full understanding of the invention can best be given by a detailed description of a construction embodying the same in the preferred form, all further preliminary description will be omitted and such a description given in connection with the accompanying drawings, forming a part of this specification, in which—

Figure 1 is a vertical cross section of the complete construction of junction box and cable terminals therein. Fig. 2 is a horizontal section on the line 2—2 of Fig. 1. Figs. 3 and 4 are details of modifications hereinafter referred to.

Referring more particularly to Figs. 1 and 2, A is the side of the man hole, B a metal plate forming the base of the junction box, and C brackets bolted to the sides of the man hole and supporting the plate B, this being the preferred construction, although it will be understood that the plate B and other parts of the junction box may be supported in any other suitable manner. In this metal plate B are drilled holes through which the terminal ends of the cables D are passed, the cables then being soldered in the plate, the plate B preferably being dipped in solder previously so as to be entirely covered with a layer of solder, although this is not absolutely necessary. The plate B may be of any suitable metal, as copper or brass which will take solder readily, or an iron plate planed or tinned so as to permit soldering may be used.

The cables having been fitted with the terminals which may be of any suitable form, the other parts of the junction box are applied to the plate B, as follows: A wooden box E open on one side is placed with the edge of its open side upon the top of the plate B, the box being somewhat smaller than the plate so as to leave a flange 10 on the plate outside the box. The box E has secured to the edge of its open side a metal flange 11 which may be screwed thereto as shown, or secured in any other suitable manner, by means of which flange the box is secured to the plate, this flange being shown in Figs. 1 and 2 as bolted to the flange 10, a gasket 12 of rubber or other suitable material being placed between the flanges 10 and 11, so as to make a water tight joint. The whole box E is covered with a sheet of metal F, preferably tin, which comes down onto the flange 11 all around the box and is soldered thereto in such a way as to cover all the screws or bolts which hold the flange to the box, so that the wooden parts of the box are entirely covered and protected by a metal sheathing. The flange 11 may be of any suitable material to permit soldering, as of copper, brass, or iron tinned for this purpose.

As above stated, my junction box may be used with terminals of any suitable form and applied to the cables in any suitable manner. I have shown, however, the preferred construction of water proof terminals in which a tube 13, preferably of hard rubber or other suitable insulating material, is placed upon the end of the cable, fitting closely thereon, this tube either being made with one end closed or being provided with a cap 14, as shown for closing it. This tube may be made of metal, however, and insulated only by the cap 14. The conductor $a$ is bared and brought out into a copper rod $b$ within the tube 13, which rod may be bare but is preferably provided with an insulating and water proof covering 15 of rubber or other suitable material. The tube 13 is filled about the conductor $a$ and rod $b$ with suitable moisture proof material 17 as shown, this together with the other features of the terminal making a moisture proof construction. With the copper rod $b$ connection is made between the different cables by the usual copper connecting strip G, the ends of the strip being connected to the rods $b$ by screws 1, as shown in Figs. 1 and 2, or by a thumb screw 2 on a screw thread formed on the copper rod *b* as shown in Fig. 3. Any other suitable construction may be used for this purpose, but those shown will be found simple and efficient.

I have shown the junction box as circular and four cables as connected therein. It will be understood, however, that the junction box may be of any suitable size to accommodate any number of cables, and that the arrangement and terminal connections of the cables will be varied in accordance with the current carried and the particular system and pressure used, as well understood in the art.

In Fig. 4, I have shown a construction for use with junction boxes of circular form, which may be used in place of that previously described, the construction avoiding the use of screws or bolts for securing the box E to the plate B. In this construction the flange 11 is made in T shape, and provided with an outside screw thread 3, and the flange 10 on the plate B is provided with a shoulder 4 carrying an internal screw thread engaging with screw thread 3 on the flange 11. The box E may thus be screwed to the plate B, as shown, the gasket 12 being placed between the flange 11 and the top of the shoulder 4. The flange 11 is preferably provided with projections 5 by which a hold is secured upon the box E for screwing it tightly into place.

It is obvious that many other modifications may be made in the construction shown without departing from my invention.

What I claim is—

1. The combination with the cables, of a water tight junction box, and water tight terminals inside said box, substantially as described.

2. The combination with metal plate B, of cables D passing through said plate and soldered therein, and a water tight box inclosing the cable terminals and forming a water tight joint with the plate, substantially as described.

3. The combination with metal plate B, of cables D passing through said plate and soldered therein, and a wooden metal covered box inclosing the cables and forming a water tight joint with the plate, substantially as described.

4. The combination with solder covered plate B, of cables D passing through said plate and soldered therein, and a wooden metal covered box inclosing the cables and forming a water tight joint with the plate, substantially as described.

5. The combination with metal plate B, of cables D passing through said plate and soldered therein, wooden box E provided with flange 11 secured to said plate B with a gasket 12 between the flange and plate, and a sheet of tin or other suitable metal F covering said box and having its edge soldered to the metal flange 11, substantially as described.

6. The combination with water proof plate B, of cables D passing through said plate and forming a water tight joint therewith, wooden box E secured to said plate B with a gasket 12 between the box and plate, and a sheet of tin or other suitable metal F covering said box and having its edge secured by a water tight joint, substantially as described.

In testimony whereof I have hereunto set my hand in the presence of two subscribing witnesses.

SAMUEL B. FOWLER.

Witnesses:
HARRIET SHAW,
I. F. AHERN.